United States Patent [19]

Claussen et al.

[11] 4,347,753
[45] Sep. 7, 1982

[54] MECHANISM FOR OPERATING A COLLET CHUCK

[75] Inventors: Reimer Claussen, Altusried; Liebhard Jung, Nesselwang, both of Fed. Rep. of Germany

[73] Assignee: A. Ott GmbH, Kempten, Fed. Rep. of Germany

[21] Appl. No.: 131,780

[22] Filed: Mar. 19, 1980

Related U.S. Application Data

[63] Continuation of Ser. No. 941,172, Sep. 11, 1978, abandoned.

[30] Foreign Application Priority Data

Sep. 13, 1977 [DE] Fed. Rep. of Germany ....... 2741166

[51] Int. Cl.³ .................... B23B 31/10; B23C 5/26; F16H 21/44
[52] U.S. Cl. .................................... 74/110; 279/4; 279/50; 279/75; 408/239 R; 409/233
[58] Field of Search .................... 279/22, 30, 43, 50, 279/51, 57, 58, 75, 4; 408/239 R, 239 A, 238; 409/233; 74/110

[56] References Cited

U.S. PATENT DOCUMENTS 3,615,100 10/1971 Banner ................................ 279/50
4,068,559 1/1978 Schmid, Jr. et al. ........... 408/239 R

FOREIGN PATENT DOCUMENTS 344654 3/1931 United Kingdom .
606777 8/1948 United Kingdom ................. 279/58

Primary Examiner—Z. R. Bilinsky
Attorney, Agent, or Firm—Toren, McGeady & Stanger

[57] ABSTRACT

In a draw-bar mechanism for moving the collet of a chuck or the like on a spindle of an automatic turning machine toward its axial clamping position and for thereafter closing the collet more slowly with greater force about a tool or workpiece to be clamped, motion is transmitted from an actuating sleeve to a draw bar or like control member by spherical thrust members movably confined between three faces obliquely inclined relative to each other. A first face is fixed relative to the spindle assembly and has one section parallel to the axis and another axially contiguous section obliquely inclined relative to the axis, the two sections merging in an exposed edge. A second face is fixed relative to the control member, and the third face is fixed relative to the actuating sleeve and has two axially consecutive sections obliquely inclined relative to each other. The faces are dimensioned and shaped in such a manner as to permit tilting of the thrust members about the exposed edge during movement of the control member in the axial collet-clamping direction while the thrust members engage the face of the actuating sleeve.

6 Claims, 3 Drawing Figures

MECHANISM FOR OPERATING A COLLET CHUCK

This is a continuation of application Ser. No. 941,172 filed on Sept. 11, 1978, and now abandoned.

This invention relates to operating mechanisms for a collet chuck, and particularly to a mechanism for operating a chuck mounted on a rotating spindle in a machine tool by means of an axially moving control member, such as a draw bar or a push-out bar.

A mechanism of the type with which this invention is concerned has been disclosed in German Pat. No. 876,789. It clamps a collet tight by means of a push-out bar and a motion transmitting device which transmits motion from an axially moving actuating member to the push-out bar by means of thrust members freely movable between three faces obliquely inclined relative to the axis of spindle rotation, one face being fixed relative to the spindle assembly, the second face being fixed relative to the control member, and the third face relative to the actuating member. One of the faces has two axially consecutive sections obliquely inclined relative to each other, the dimensions and positions of the three faces being selected in such a manner that the control member is moved at a decreasing rate relative to the rate of movement of the actuating member when the control member is moved in the axial direction in which it causes closing of the collet.

The first face is carried by a ring threadedly fastened on the spindle. The second face is located on a second ring movably mounted on a sleeve which slides along the hollow spindle, the sleeve carrying the third face opposite the first-mentioned ring. The first and second faces converge in a radially outward direction. Radial projections extend from the second ring into the spindle through axially elongated slots for engagement with the end of the push-out bar remote from the collet. Balls are confined between the three faces and are driven by the third face into the space between the first and second faces when the sleeve is moved, and thereby push the two rings apart. The second ring is thereby caused to slide along the sleeve and to move the push-out bar toward closing the collet. A helical spring is interposed between the second ring and a collar of the sleeve and returns the second ring to its starting position near the first ring when the sleeve is retracted.

A similar device is known from U.S. Pat. No. 3,533,636. It is a common disadvantage of mechanisms of this type, particularly when employed with tools whose shanks taper at a steep angle, that the control member, that is, a push-out bar or draw bar, moves axially only a very short distance from the fully open to the clamping position. The tool to be clamped must be moved manually over a relatively great distance and must be positioned very carefully, a task that is at least inconvenient, particularly with heavy tools, such as milling tools.

A mechanism for operating a collet chuck disclosed in U.S. Pat. No. 3,802,713 is provided with a motion transmitting mechanism whose actuating member has an obliquely inclined surface of two sections inclined relative to each other. The angle of inclination of the two sections in the direction of the axis of rotation is selected in such a manner that the ratio between the rate of movement of the actuating member to the simultaneous rate of movement of the collet control member increases as the collet approaches its clamping position.

The transmission ratio or mechanical advantage of such a motion transmitting device thus varies as a function of the movement of the actuating member and is arranged in such a manner that the transmission ratio or mechanical advantage is greatest in the clamping position of the collet so that a relatively great clamping force can be exerted on the control member or the chuck. As the clamping position is approached, relatively great movement of the actuating member causes a small displacement of the control member. While the collet is near its open position, movement of the actuating member causes a relatively great axial movement of the control member.

The transmission ratio in the known motion transmitting devices of the type described is determined solely by the angles of inclination of the three faces engaging the thrust members, the angles being defined by planes tangential to the thrust members at the three points of contact. The stroke of the control member relative to the spindle is limited by the dimensions of the thrust members if the angles of inclination of the cooperating faces remain constant. For any selected clamping stroke, the axial movement of the control member relative to the spindle thus cannot be increased at will in the known motion transmitting devices if the overall dimensions of the operating mechanism are not to be increased to accommodate larger thrust members.

It is an important object of this invention to provide an operating mechanism for a collet chuck which permits large clamping forces to be exerted after a relatively long positioning movement of the chuck elements, and to achieve this improvement in a mechanism of modest external dimensions.

This is achieved in a mechanism of the type described above with reference to U.S. Pat. No. 3,802,713, by additionally dividing another one of the obliquely inclined faces into two axially consecutive sections which merge in an exposed edge, the several faces being dimensioned and shaped to permit tilting of the thrust member during movement of the control member in the collet-clamping direction while the thrust members engage the first-mentioned, sectioned face.

The tilting movement of the thrust member enlarges the range of low transmission ratio or low mechanical advantage in the motion transmitting device so that the range of axial movement of the control member is increased for a given diameter of the thrust members, and the radial movement of the thrust members necessary for achieving the required axial movement of the control member is reduced. Stated differently, the ratio of the positioning stroke of the control member to its clamping stroke can be increased without enlarging the thrust members. When the actuating member is sleeve-shaped, the internal diameter of the sleeve and of its internal face may be reduced, and smaller thrust members may be employed so that the overall dimensions of the operating mechanism may be reduced. The term "tilting movement," as employed hereinafter, will be understood not to be limited to purely angular movement, but not to exclude a minor amount of sliding movement of the thrust members relative to a somewhat rounded exposed edge.

Other features, additional objects, and many of the attendant advantages of this invention will readily be appreciated as the same becomes better understood by reference to the following detailed description of preferred embodiments when considered in connection with the appended drawing in which.

Figure 1:
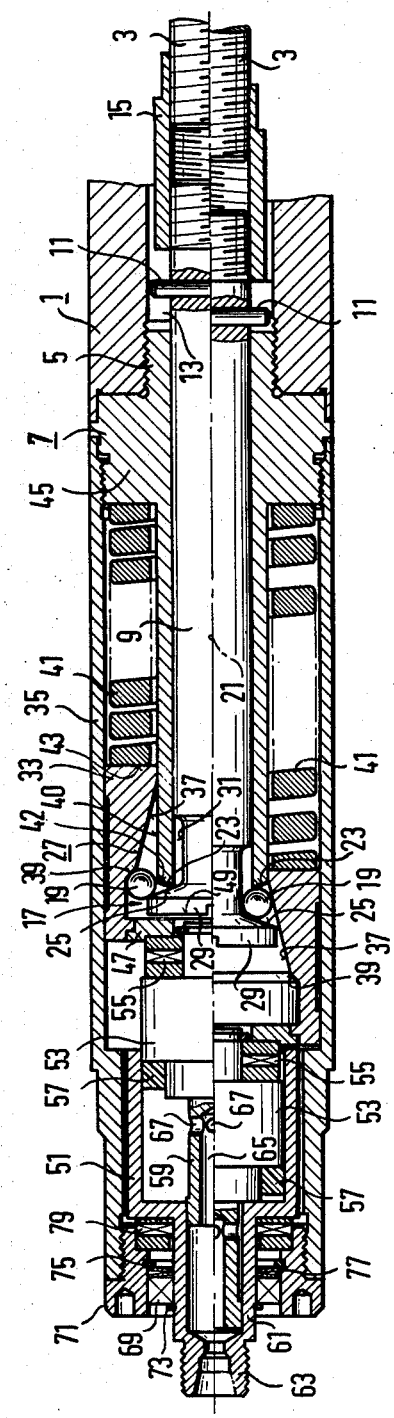
FIG. 1 shows an operating mechanism of the invention for a collet chuck in section on its axis, the chuck releasing position being shown in the upper half of FIG. 1, the chuck clamping position in the lower half.
Figure 2:
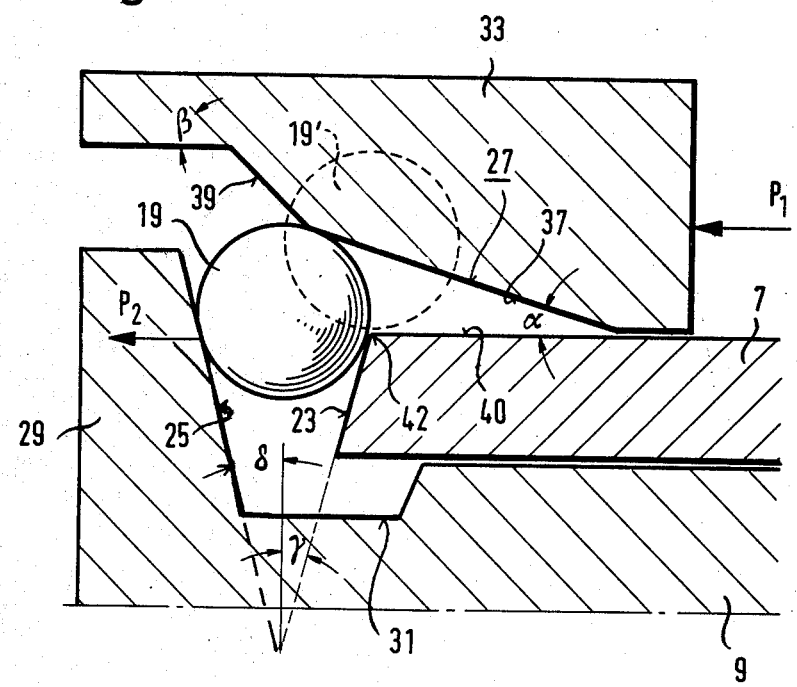
FIG. 2 illustrates elements of the mechanism of FIG. 1 on a much larger scale.

The spindle assembly for a machine tool illustrated in FIGS. 1 and 2 includes a tubular drive spindle 1 whose non-illustrated front end carries a clamping collar of the type shown in U.S. Pat. No. 3,533,636, FIG. 3, for cooperation with a collet. Internal threads of the spindle portion 1 coaxially engage the threaded front end 5 of a tube 7. A radial flange 45 on the tube 7 axially secures the spindle 1 on the tube 7, and a tubular shell 35 threadedly attached to the flange 7 and flush with the spindle 1 spacedly envelops the tube 7 and extends axially rearward beyond the tube 7.

The draw bar of the illustrated mechanism, axially movable in the spindle assembly for operating the non-illustrated collet, includes a control bar 3 coaxially received in the spindle 1 and a control rod 9 coaxially guided in the tube 7. The bar 3 and rod 9 are fixedly connected by an internally threaded coupling sleeve 15. The draw bar or control member 3, 9 is secured in the spindle assembly against rotation about the spindle axis 21 by a transverse pin 11 engaging an axially elongated slot 13 in the front end 5.

The control rod 9 may be moved axially by a motion transmitting device 17 whose operating elements are shown on a larger scale in FIG. 2. It includes a circular row of steel balls 19 which are confined axially and radially relative to the axis of spindle rotation by three conically tapering surfaces of rotation. The first face 23 is the annular rear face of the tube 7 and tapers rearwardly. The control rod 9 has an enlarged rear head 29 projecting axially from the tube 7. The second face is the conical front face 25 of the head 29 which tapers toward an annular groove 31 at the rear end of the cylindrical control rod portion. The face 25 projects radially outward beyond the face 23.

An actuating sleeve 33 is axially guided between the shell 35 and the tube 7. Its bore 27 partly tapers in a forward direction. Its third face includes a conical surface portion 37 near the front end of the sleeve 33, inclined relative to the axis 21 at an acute angle α much smaller than the acute angle of inclination β of a rearwardly contiguous surface section 39. In the position illustrated in FIG. 2 in fully drawn lines, the balls 19 make point contact with the exposed, circular edge 42 at which the outer axial face 40 and the annular rear face 23 of the tube 7 merge at an obtuse angle.

A heavy coil spring 41 is radially confined between the shell 35 and the tube 7 of the spindle assembly and held under axially compressive stress between the flange 45 and the radial front face 43 of the actuating sleeve 33 in all axial positions of the latter. An inner, radial flange 47 is releasably mounted in the rear orifice of the sleeve 33 to facilitate assembly of the mechanism. It limits rearward movement of the control rod 9 by axially abutting engagement with the radial end face 49 of the head 29.

The cylinder 51 of a hydraulic motor at the rear end of the illustrated mechanism receives a piston 53 sealed to the cylinder by a ring 57. A thrust bearing 55 is interposed between the piston 53 and the flange 47. A tubular piston rod 59, coaxially attached to the piston 53, is guided in a reduced rear portion 61 of the cylinder 51. A nipple 63 on the cylinder portion 61 is normally connected to the control valve of a pressure system (not shown) for admitting hydraulic fluid or compressed air to the cylinder 51 through the axial bore 65 and radial bores 67 in the piston rod 59, and for venting the cylinder.

The rear end of the shell 35 is rotatably mounted on the normally stationary cylinder 51 by means of a bearing 69 in a reinforcing sleeve 71 fixed in the rear end of the shell 35. Spring retaining rings 73, 75 and Belleville washers 77 axially secure the bearing 69 in the sleeve 71. Another axial thrust bearing 79 is interposed between a radial shoulder of the cylinder 51 and an opposite shoulder of the sleeve 71. The nipple 63 is an element of the fixed supporting structure on which the illustrated mechanism is mounted.

In the retracted clamping position of the mechanism shown at the bottom of FIG. 1, the cylinder 51 is vented to the atmosphere or to the sump of a hydraulic system, and the spring 41 is expanded to the limit set by abutting engagement of the sleeve 33 with an internal shoulder of the shell 35. When hydraulic fluid is admitted to the cylinder 51, the piston 53 is moved forward against the restraint of the spring 41. The forward movement of the sleeve 33 relative to the still stationary control rod 9 causes the balls 19 to be released by the conical surface 37. Their axial position is defined between the rear face 23 of the tube 7 and the annular front face 25 of the head 29 while the sleeve 33 moves forward. When the flange 47 abuttingly engages the end face 49 of the head 29, the balls 19 are radially aligned with the conical surface 39 of the sleeve 33 and are forced radially outward against the surface 39 by forward movement of the head 29 relative to the tube 7.

When the cylinder 51 thereafter is vented, the spring 41 expands, and the balls 19 transmit the resulting rearward movement of the sleeve 33 to the head 29. Because of the difference in magnitude between the angles α and β, the ratio between the axial distance traveled by the sleeve 33 and the distance traveled by the control rod 9 is smaller during engagement of the balls 19 with the surface 39 than during their engagement with the surface 37. The rod 9 moves relatively fast when the balls engage the surface 39, and it is moved with great applied force during ball engagement with the surface 37.

The mechanical advantage in the motion transmitting device illustrated in FIG. 2 may be approximated for the case of the balls 19 simultaneously engaging the tube 7, the head 29, and the sleeve 33 from the equation:

$$R = \frac{P_2}{P_1} = \frac{\cos \delta}{\sin \alpha} \times \frac{\cos (\alpha - \gamma)}{\sin (\gamma + \delta)}$$

wherein $P_1$ is the force exerted on the sleeve 33 in the direction of the axis 21, and $P_2$ is the clamping force transmitted to the control rod 9 by the device 17. The formula is based on the assumption that the effects of friction may be disregarded. γ and δ are the angles respectively defined by planes tangential to the balls 19 at the points of contact with the tube 7 and head 29 and by a plane perpendicular to the axis 21. α is the angle of inclination of a tangential plane at the point of ball contact with the sleeve 33 relative to the axis 21. From this equation, the mechanical advantage can be calculated for each position of the thrust bodies, that is, the balls 19, even while they move over the edge 42 and the edge defined by the juncture of the surfaces 37, 39, if frictional effects can be disregarded.

The path of movement of the control rod 9 at a given value of R is a function of the dimensions of the conical surfaces and of the diameters of the balls 19. For a smaller value of R, the control rod movement is greater. In order to reduce the value of R during engagement of the surface 39 in the bore 27 to less than the value determined by the above equation, the conical faces 23, 25 and the surface 39 in the bore 27 are so dimensioned that the balls 19 are tilted during engagement with the surface 39 about the exposed edge 42 defined by the surfaces 23 and 40 of the tube 7 so that the balls move in the arc whose center is located within the tube 7.

The starting position of the balls during this tilting movement is shown in FIG. 2 in broken lines at 19'. As long as the balls 19 are shifted along the axial face 40 of the tube 7, R equals 1. During the tilting movement of the balls 19 around the edge 42 while they are also engaged by the surfaces 39 and 25, the value of R increases continuously until it reaches a constant maximum because of engagement of the balls with the surface 23. The surfaces 37, 39 are so dimensioned that the tilting movement of the balls 19 is terminated when the points of engagement of the balls 19 move from the surface 39 to the surface 37. This position of the balls is shown in FIG. 2 in fully drawn lines.

Because the balls are permitted to tilt about the edge 42, the balls need to perform only a relatively short, radial movement, and the entire mechanism may be made correspondingly slimmer. Moreover, for a predetermined axial stroke of the device 17, the internal diameter of the sleeve 33 may be reduced, and substantially smaller balls may be employed. Even when relatively small in diameter, the balls can be pressed sufficiently far between the conical surfaces 23, 25.

Figure 3:
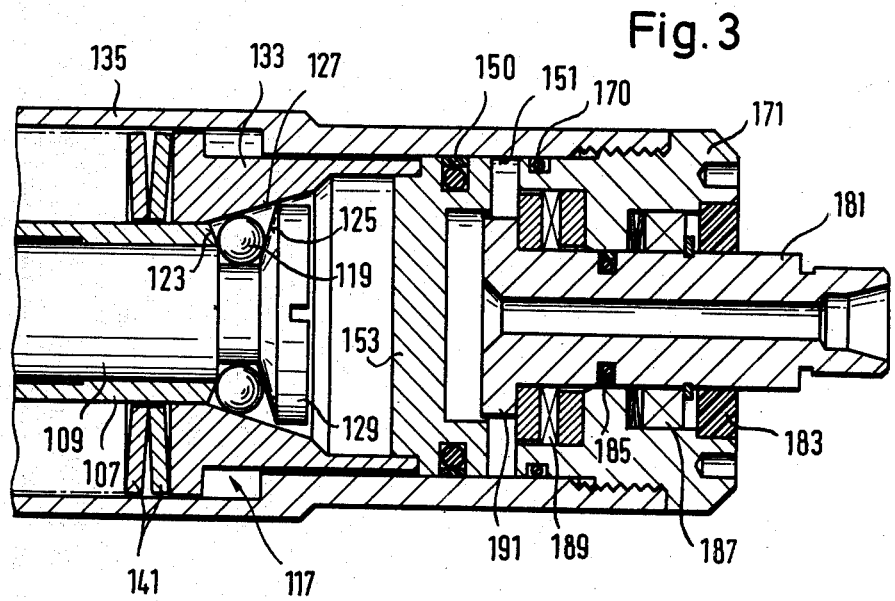
FIG. 3 is a fragmentary, axially sectional view of a modified mechanism of the invention.

The modified embodiment of the invention illustrated in FIG. 3 is identical with the mechanism described above with reference to FIGS. 1 and 2 as far as not explicitly shown and described otherwise. It is equipped with a hydraulic actuator simpler than that referred to above. As in the first-described embodiment, a cylindrical control rod 109 is axially slidable in a tube 107. The rod 109 is shifted by means of a motion transmitting device 117 whose balls 119 are confined between surfaces 123, 125, 127, the surface 123 being carried by the tube 107, the second surface 125 on a head 129 of the control rod 109, and the third surface 127 being on a sleeve 133 which is guided in a shell 135. A stack of Belleville washers or cup springs 141 is mounted on the tube 107 to bias the sleeve 133 into the collet clamping position, that is, toward the right, as viewed in FIG. 3.

The hydraulic motor operates against the resilient restraint of the Belleville washers 141 and includes a piston 153 movably sealed in a cylinder cavity 151 of the shell 135. The piston 153 abuttingly transmits the pressure of the hydraulic fluid to the sleeve 133. The rear end of the shell 135 is closed by a bushing 171 sealed to the shell 135 by a gasket 170. A connecting nipple 181 for a hydraulic pressure line is journaled in the bushing. The nipple 181 is sealed to the bushing 171 by sealing rings 183, 185 and rotatably mounted in an axially resilient radial bearing 187 and in an axial thrust bearing 189. The nipple 181 abuts against the axial thrust bearing 189 by means of a collar 191.

The modified mechanism of FIG. 3 is constructed at lower cost than the apparatus of FIG. 1. Moreover, all seals and gaskets are relieved of pressure during rotation of the spindle, a feature important is extending the useful life of the mechanism between maintenance operations.

The sections 37, 39 of the third face in the bore 27 of the actuating sleeve 33 are similar to corresponding structure in the aforementioned U.S. Pat. No. 3,802,713. In the embodiment of the invention illustrated in FIG. 1, the first face of the spindle assembly is shown to consist of the two sections 23, 40 which merge in the exposed edge 42, and this arrangement is preferred. However, the balls 19 or other thrust members of circular cross section may also be tilted with similar results about an exposed edge defined by two axially consecutive sections of the suitably modified second face 25 on the control member 9. By analogy, the illustrated sectioned configuration of the third face in the bore 27, which is shown to envelop the first and second faces, may be transferred to another one of the three faces.

Some of the elements of the motion transmitting device 17 may be transposed or inverted. The actuating sleeve may envelop the control member and the portion of the spindle assembly carrying the first, ball-confining face, as specifically illustrated, but a reversed arrangement will readily be devised in which the outer surface of the actuating sleeve carries the two sections of the third face.

Conical faces are easier to machine to necessary tolerances than other tapering or inclined faces, but the illustrated and described, conical shape of the faces engaged by the thrust members 19 is not otherwise critical. All faces and face portions are defined by straight lines in the axial planes of the drawing, but faces defined by suitable curved lines would be equally operative.

It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the appended claims.

What is claimed is:

1. A spindle mechanism for operating a collet chuck, comprising an elongated tube member having an axis and a first surface portion on one end of said tube member which forms a first angle of inclination relative to a plane perpendicular to the axis of said tube member and a second surface portion which forms a second angle of inclination relative to the plane perpendicular to the axis of said tube member, said first and second surface portions being serially connected in the direction of the axis of said tube member thereby forming an edge on one end of said tube member which edge extends in the plane perpendicular to the axis of said tube member, an elongated rod member mounted for movement in the direction of the axis of said tube member over a certain path between a release position and a clamp position, one end of said rod member having a conical surface facing said first surface portion on said tube member, a sleeve member mounted for movement in the direction of the axis of said tube member for moving said rod member between said release and said clamp positions, said sleeve member having at least two surface portions each facing said tube and rod members, said at least two surface portions being angularly inclined relative to each other and serially connected in the direction of the axis of said tube member, means for biasing said sleeve member to move said rod member toward said clamp position, and a number of ball members arranged in force transmitting relationship between one of said first and said second surface portions of said tube member, said conical surface of said rod member and one of said at least two surface portions of said sleeve member, said at least two surface portions of said sleeve member forming corresponding angles of inclination relative to the axis of said tube member in the longitudinal cross-section thereof which corresponding angles are selected so that said ball members transfer a larger ratio of the rate of movement of said sleeve member to said rod member when said rod member begins to move away from said release position in response to forces exerted by said ball members on the conical surface of said rod member, and so that said ball members transfer a lesser ratio of the rate of movement of said sleeve member to said rod member after said ball members move over said edge on said tube member and said rod member is urged toward said clamp position to transmit a clamping force to a collet chuck provided at the other end of said rod member in response to forces exerted by said ball members on the conical surface of said rod member, said ball members remaining in force locking engagement with said tube, said rod and said sleeve members over the full path of movement of said rod member.

2. A spindle mechanism according to claim 1 wherein the second surface portion of said tube member extends parallel to the axis of said tube member to define a guide surface for said ball members.

3. A spindle mechanism according to claims 1 or 2 wherein said ball members are arranged to forcibly engage a single one of said at least two surface portions of said sleeve member as said ball members move over said edge on said tube member.

4. A spindle mechanism according to claims 1 or 2 wherein said at least two surface portions of said sleeve member and the first and second surface portions of said tube member are arranged so that said ball members forcibly engage a different one of said at least two surface portions of said sleeve member after said ball members move over said edge on said tube member.

5. A spindle mechanism according to claims 1 or 2, wherein said rod member comprises a clamping bar mounted for axial sliding movement within said tube member, said clamping bar having a head radially extending past said one end of said tube member and having said conical surface thereon, and said sleeve member surrounds said tube member and the head of said clamping bar, said sleeve member having said at least two surface portions on the inner circumferential surface thereof.

6. A spindle mechanism according to claim 5, wherein said at least two surface portions on said sleeve member define straight lines in the axial cross section of said sleeve member.

* * * * *